United States Patent [19]

Vicik et al.

[11] 4,188,350

[45] Feb. 12, 1980

[54] OLEFIN POLYMER BLENDS AND FILMS THEREFROM

[75] Inventors: Stephen J. Vicik, Darien; William J. Kohler, Westmont, both of Ill.; James O. Funderburk, Jr., Brookfield Center, Conn.

[73] Assignee: Union Carbide Corporation, New York, N.Y.

[21] Appl. No.: 870,137

[22] Filed: Jan. 17, 1978

[51] Int. Cl.² .............................................. C08L 23/16
[52] U.S. Cl. .................................... 525/232; 264/515; 428/516; 428/517; 525/240
[58] Field of Search ...................................... 260/897 A

[56] References Cited

U.S. PATENT DOCUMENTS

| T955,009 | 2/1977 | Lansbury et al. | 428/515 |
|---|---|---|---|
| 3,832,270 | 8/1974 | Schirmer | 161/165 |
| 3,849,520 | 11/1974 | Bullard et al. | 260/897 A |
| 3,900,534 | 8/1975 | Schard | 260/897 A |
| 4,078,020 | 3/1978 | Rose et al. | 260/897 A |

Primary Examiner—Carman J. Seccuro
Attorney, Agent, or Firm—David Fink

[57] ABSTRACT

A heat-shrinkable multilayer film suitable for use in the packaging of a frozen poultry, includes a first outer layer comprising a blend of a propylene-ethylene copolymer having a high isotactic molecular structure with less than about 6% by weight ethylene and having a melt flow of from about 1.5 to about 18 decigrams per minute; a (butene-1)-ethylene copolymer having a high isotactic molecular structure with less than about 10% by weight being ethylene and having a melt flow of from about 0.1 to about 5.0 decigrams per minute, and a thermoplastic elastomer selected from the group consisting of ethylene-propylene copolymers and ethylene-propylene diene terpolymers, the ratio by weight of the propylene-ethylene copolymer to the (butene-1)-ethylene copolymer being from about 2:1 to about 1:2 and the thermoplastic elastomer being present from about 10% to about 50% by weight; at least one core layer capable of being biaxially oriented and heat shrinkable and comprising an extrudable adhesive; and a second outer layer comprising a polymer selected from the group consisting of ethylene homopolymers and copolymers each having a highly branched molecular structure; the multilayer film being biaxially oriented.

26 Claims, No Drawings

OLEFIN POLYMER BLENDS AND FILMS THEREFROM

The present invention relates to a heat-shrinkable multilayer film, and more particularly to a multilayer film suitable for use in the packaging of a frozen poultry. In addition, the invention relates to a bag fabricated from the multilayer film.

The invention also relates to a polymer resin mixture and films and bags produced from the polymer resin mixtures for use in connection with the packaging of poultry.

Generally, the packaging operation presently being commercially used to package frozen poultry necessitates that the packaging materials exhibit special properties. The typical packaging operation includes the following steps:

1. dropping the bird into a bag fabricated from a shrinkable film;
2. clamping the neck of the bag;
3. transporting the bird with the entire weight thereof being supported by the neck of the bag;
4. subjecting the bag to a temperature from about 90° C. to about 95° C. for a period of time up to about 7 seconds to shrink the bag tightly around the bird;
5. quick freezing and then storing the packaged bird at temperatures as low as about −40° C.; and
6. transporting the packaged bird and thereby possibly result in the continuous abrasion and impact between packaged birds.

The packaging operation requires the shrinkable film to possess the following general properties:

1. Sufficient tensile strength to support the weight of the bird;
2. Sufficient shrinkage and reduction in the area of the film for a temperature of from about 90° C. to 95° C. to conform the film to the irregular shape of the bird. Generally at least 25% linear size reduction (unrestrained) in the direction transverse to the machine direction of the film has been required, usually at least 29%, and preferably at least 31%.
3. Sufficient shrink force at a temperature from about 90° C. to about 95° C., for example, to pull the wings of a bird tightly towards the body and sufficient residual shrink force to maintain a tight wrap around the bird;
4. Sufficient strength for a heat seal so that after the film has been fabricated into a bag by a conventional heat sealing operation, there will be no seal failure during a subsequent shrink packaging operation at a temperature from about 90° C. to about 95° C.; and
5. Sufficient impact strength and abrasion resistance at about −40° C. to protect the bird during freezing, shipping, and consumer handling.

In addition to the above enumerated general requirements, the film must possess dimensional stability and non-tacky surfaces, and should have processing characteristics which enable thickness control and high production efficiency at reasonable manufacturing speeds.

In the prior art, several film materials have been either used or proposed for packaging frozen poultry. For example, the U.S. Pat. No. 3,555,604 to Pahlke discloses a process for producing bioriented low density polyethylene in the form of a shrinkable thermoplastic film. In this process, a tubing of the polyethylene material defines an isolated bubble maintained by simple nip rollers and the bubble is subjected to heat and radial expansion by internal pressure near the draw point of the tubing, that is, the point at which the polyethylene material is at or just below its softening point. This process is generally referred to as the "double bubble" method.

The biaxial orienting of low density polyethylene can also be carried out by using an irradiated film and stretching it by methods well known in the art to obtain a film having satisfactory melt strength and shrinkage values at a temperature of about 90° C. The film, however, is relatively expensive and has marginal heat sealing properties because of the loss of thermoplastic characteristics due to induced crosslinking of the polymer chains from the irradiation. This also inhibits the reprocessing of waste film. The U.S. Pat. No. 3,365,520 to Foster et al describes the xylene solubility test for distinguishing between irradiated and non-irradiated polyethylene.

The aforementioned U.S. Pat. No. 3,365,520 also discloses a blend of an ionomer and an ethylene homopolymer or copolymer for producing a bioriented film having exceptional shrinkage and shrink force at a temperature of about 90° C. and having good processing characteristics. The film has very poor heat sealing properties for use in packaging poultry. While heat sealing strength at room temperature is adequate, the strength at about 95° C. is extremely low.

The U.S. Pat. No. 3,900,635 to Funderburk et al discloses a multilayer film including a blend of an ionomer and ethylene homopolymers or copolymers, and another layer of ethylene homopolymers or copolymers. The film exhibits adequate shrinkage at about 90° C. and good seal strength. The film, however, does not possess some other important properties such as abrasion resistance much better than a bioriented low density polyethylene single layer film.

The U.S. Pat. No. 3,754,063 to Schirmer relates to a laminated, tubular, thermoplastic film produced by continuously extruding a layer of an ethylene vinyl acetate copolymer onto a tubular substrate of a predominantly ethylene polymer material and continuously extruding an admixed isotactic polypropylene, polybutene-1 and atactic polypropylene polymer layer as the outer layer thereon and then orienting the laminate.

The U.S. Pat. No. 3,891,008 to D'Entremont is an improved film with respect to the aforementioned U.S. Pat. No. 3,754,063 and teaches a multilayer film including a substrate layer of an oriented thermoplastic material in combination with a layer comprising a copolymer of ethylene and propylene, preferably from 60% to 95% by weight and polybutene-1, preferably 5% to 40% by weight.

The U.S. Pat. No. 3,634,553 relates to a heat shrinkable film comprising a blend of from about 10% to about 90% by weight of a high isotactic content propylene resin having a melt flow at 230° C. of from about 0.1 to about 5.0 decigrams per minute, and from about 10% to about 90% by weight of an ethylene-butene-1 copolymer resin containing less than about 10% by weight ethylene. The U.S. Pat. No. 3,634,552 is closely related to the aforementioned U.S. Pat. No. 3,634,553 and is directed to the resinous blend composition.

Although each of the known films meet many of the requirements for packaging applications such as the packaging of frozen poultry, the need still exists for improved heat shrinkable films.

In accordance with the present invention there is provided a polymer resin mixture and heat-shrinkable thermoplastic film prepared therefrom, the resin mixture comprising a propylene-ethylene copolymer having a high isotactic molecular structure, containing up to about 6% by weight ethylene, and having a melt flow of from about 1.5 to about 18 decigrams per minute; a (butene-1)-ethylene copolymer having a high isotactic molecular structure, containing from about 1% to about 10% by weight ethylene, and having a melt flow of from about 0.1 to about 5.0 decigrams per minute; and a thermoplastic elastomer selected from the group consisting of ethylene-propylene copolymers and ethylene propylene diene terpolymers, the ratio by weight of the propylene-ethylene copolymer to the (butene-1)-ethylene copolymer being from about 2:1 to about 1:2 and the thermoplastic elastomer being present from about 10% by weight to about 50% by weight.

The invention also relates to a heat-shrinkable multilayer film suitable for use in the packaging of frozen poultry, including a first outer layer comprising a blend of a propylene-ethylene copolymer having a high isotactic molecular structure, containing up to about 6% by weight ethylene, and having a melt flow of from about 1.5 to about 18 decigrams per minute; a (butene-1)-ethylene copolymer having a high isotactic molecular structure, containing from about 1% to about 10% by weight ethylene, and having a melt flow of from about 0.1 to about 5.0 decigrams per minute; and a thermoplastic elastomer selected from the group consisting of ethylene-propylene copolymers and ethylene propylene diene terpolymers, the ratio by weight of the propylene-ethylene copolymer to the (butene-1)-ethylene copolymer being from about 2:1 to about 1:2 and the thermoplastic elastomer being present from about 10% by weight to about 50% by weight; at least one core layer comprising an extrudable adhesive capable of being biaxially oriented and heat shrinkable; and a second outer layer comprising a polymer selected from the group consisting of ethylene homopolymers and copolymers each having a highly branched molecular structure, the film being biaxially oriented.

Generally, the propylene-ethylene copolymer for the invention can be prepared by a stereo-specific catalytic polymerization process which generally yields isotactic molecular structures containing up to about 6% by weight ethylene monomer copolymerized with propylene. Preferably, the propylene-ethylene copolymer should be a film grade resin having a density of from about 0.89 to about 0.91 gram per cubic centimeter. Preferably, the melt flow is from about 3.5 to about 12.0 decigrams per minute. Preferably the ethylene content should be at least about 2% by weight and more preferably about 4% by weight.

Generally, the (butene-1)-ethylene copolymers suitable for the invention may be produced by copolymerizing butene-1 and ethylene in the presence of stereo-specific polymerization catalysts such as disclosed in the U.S. Pat. No. 3,629,940 and described in the aforementioned U.S. Pat. No. 3,634,552. The (butene-1)-ethylene copolymers for the invention are further characterized by a methylene absorption value of from about 0.001 to about 0.04 absorbance units per unit at a wave number of 720, and a DTA thermal peak value of at least 80° C. and in the range of 80° C. to 130° C. As used herein, DTA designates differential thermal analysis carried out by heating at a rate of rise of 5° C. per minute.

Preferably, the (butene-1)-ethylene copolymer contains from about 3% to about 6% by weight of ethylene.

While the weight ratio in the first outer layer for the propylene-ethylene copolymer to the (butene-1)-ethylene copolymer is from about 2:1 to about 1:2, a weight ratio of about 1:1 is preferable.

Generally, the ethylene-propylene copolymer elastomer for the invention includes at least about 50% by weight ethylene, preferably 70% by weight, and has a Mooney viscosity at 260° F. (ML 1+8 minutes) of from about 23 to about 50 centipoises.

The thermoplastic elastomer can also be an ethylene-propylene diene modified terpolymer. One commercially available ethylene terpolymer suitable for the invention but not food approved includes the E. I. Du Pont de Nemours & Co. product sold under the tradename Nordel 1500. The Nordel 1500 is a terpolymer of ethylene, propylene and 1, 4 hexadiene having a specific density of about 0.85 and Mooney viscosity at 250° F. (ML 2+10) of about 58±6 centipoises.

The thermoplastic elastomer in the first outer layer imparts a surprising improvement in the shrink properties of the film and the presence of the thermoplastic elastomer results in the acceptable shrink properties of the film for temperatures less than about 100° C. The amount of the thermoplastic elastomer can be as high as about 50% by weight or even greater but the tackiness of the blend may be unacceptable at the higher levels. Preferably, the amount should be from about 20% to about 40% by weight.

Generally, the core layer should be capable of being bioriented by the "double bubble" method of the aforementioned U.S. Pat. No. 3,555,604 and should exhibit high shrinkage for temperatures less than about 100° C. An ionomer and/or an ethylene vinyl acetate copolymer are suitable materials. Ionomers are well-known in the art and are generally a copolymer of ethylene and an ethylenically unsaturated acid such as acrylic and methacrylic acid, wherein all or part of the acid has been neutralized to form a salt such as the zinc or the sodium salts. Suitable ionomers are disclosed in the U.S. Pat. No. 3,365,520 to Foster et al. Generally, the ethylene vinyl acetate copolymers have a melt flow of from about 0.1 to about 1.0 decigrams per minute and contain a vinyl acetate content of from about 9% to about 12% by weight.

The ethylene homopolymers and copolymers for the second outer layer can be produced by catalytic high pressure polymerization process which generally yield highly branched polymer molecules such as low density polyethylene and copolymers of ethylene and olefinically unsaturated monomers. In general, the olefin polymers for the second outer layer should have a density from about 0.910 to about 0.925 gram per cubic centimeter and a melt flow of from 0.05 to about 1.0 decigrams per minute. Typical olefinically unsaturated monomers are given in the aforementioned U.S. Pat. No. 3,365,520.

Generally, the thickness of the film is from about 2.0 mils to about 2.75 mils, preferably 2.5 mils. A film having a thickness less than about 2.0 mils tends to be physically weak for use in the poultry packaging industry while a film having a thickness greater than about 2.75 mils tends to be difficult to biorient. Each of the outer layers can have a thickness of from about 35% to about 50% of the total film thickness. The core layer can have a negligible thickness such as about 0.2 mil and up to about 20% of the total film thickness.

In general, various conventional additives such as slip agents, antiblocking agents, and pigments can be incorporated in the films in accordance with conventional practice.

The properties of the polymers described herein unless otherwise indicated have their properties determined according to the following test methods:
Density—ASTM D-1505
Melt flow—ASTM D-1238
  Polypropylene—Condition L
  (Butene-1)-ethylene—Condition E
  Ethylene-propylene elastomer—Condition L
  Polyethylene—Condition E All percentages and parts given herein are by weight unless otherwise indicated.

Illustrative, non-limiting examples of the practice of the invention are set out below. Numerous other examples can readily be evolved in the light of the guiding principles and teachings contained herein. The examples given herein are intended to illustrate the invention and not in any sense to limit the manner in which the invention can be practiced.

EXAMPLES 1 to 4

Examples 1 to 4 were carried out to show the effect of the thermoplastic elastomer in a multilayer film.

Each of the examples 1 to 4 had a core layer of a commercially available ionomer (Surlyn 1650, E. I. du Pont de Nemours & Co.) having a melt flow of about 1.4 decigrams per minute, and containing about 12% by weight ethylene-methacrylic acid copolymer with 13% conversion to a zinc salt. For each, the second outer layer was a polyethylene having a melt flow of about 0.1 decigram per minute and having a density of about 0.917 gram per cubic centimeter and a $TiO_2$ pigment for opacity and color.

The first outer layer for the example 1 was a blend of equal amounts of a commercially available polypropylene-ethylene copolymer (PP 9818, Diamond Shamrock) having a metal flow of about 12.0 decigrams per minute, having a density of about 0.899 gram per cubic centimeter, and containing about 4% by weight of ethylene and a commercially available (butene-1)-ethylene copolymer (Witron 1200, Witco Chemical Co.) having a melt flow of about 2.0 and having a density of about 0.91 gram per cubic centimeter. No thermoplastic elastomer was included.

The first outer layer for the example 2 was similar to the example 1 except that it included about 20% by weight of a commercially available ethylene-propylene copolymer elastomer (Vistalon 702, Exxon Chemical Co.) having a melt flow at 190° C. (21,600 grams) of about 27 decigrams per minute, having a Mooney viscosity at 260° (ML 1+8 minutes) of about 23 centipoises, and containing about 70% by weight ethylene.

The first outer layer of the example 3 was similar to the example 2 except that the elastomer content was about 40% by weight.

The first outer layer of the example 4 was similar to the example 3 except that the elastomer was a commercially available ethylene-propylene diene terpolymer (Telcar 303, B. F. Goodrich Co.).

The multilayer films for the examples 1 to 4 were produced by conventional methods by coextrusion of layers through a multilayer tubular die at 370° F. to form a primary tube having a diameter of about 1.45 inches and having a thickness of about 0.060 inch. The primary tube was water quenched and flattened with a first pair of pinch rollers at about 8 fpm and then continuously biaxially oriented by passing the primary tube through a cylindrical infra-red heater to heat it to slightly below its melting point and expanding the primary tube with air to from about 4 to about 6 times its diameter while stretching to a similar degree with a second pair of pinch rollers rotating at a rate of about 43 fpm.

Each film had a thickness of about 2.5 mils with the first and second outer layers each being about 1.0 mil.

Table 1 compares the unrestrained machine direction and transverse direction shrinkage of the films of the examples 1 to 4 for a temperature of about 90° C.

The film of the example 1 is considered acceptable for the poultry packaging described herein, however, films having a shrinkage of at least 31% in the transverse direction at about 90° C. are preferred. The examples 2 to 4 show the surprising improvement obtained for films including the thermoplastic elastomer.

Table 1

| Example | Elastomer and Percentage | Percent Unrestrained Shrinkage | |
|---|---|---|---|
| | | Machine Direction | Transverse Direction |
| 1 | 0 | 21 | 29 |
| 2 | Vistalon 702 20% | 22 | 33 |
| 3 | Vistalon 702 40% | 27 | 38 |
| 4 | Telcar 303 40% | 24 | 34 |

EXAMPLES 5 to 7

Examples 5 to 7 were carried out to compare the use of a thermoplastic elastomer to a polyethylene homopolymer and an ethylene-propylene block copolymer.

The example 5 was the same as the example 2.

The example 6 was the same as the example 2 except that the elastomer was replaced by a commercially available polyethylene homopolymer having a melt flow of about 0.1 decigram per minute and having a density of about 0.921 gram per cubic centimeter.

The example 7 was the same as the example 2 except that the elastomer was replaced by a commercially available ethylene-propylene block copolymer (Polyallomer 5020, Eastman Chemical Corp.) having a melt flow of about 2.0 decigrams per minute and having a density of about 0.899 grams per cubic centimeter.

Table 2 shows the unrestrained transverse direction shrinkage for the examples 5 to 7 for about 90° C. Only the example 5, which included the thermoplastic elastomer, exhibited a preferred value.

Table 2

| Example | Elastomer or Replacement | Percent Unrestrained Shrinkage Transverse Direction |
|---|---|---|
| 5 | Vistalon 702 | 32 |
| 6 | Polyethylene Homopolymer | 27.5 |
| 7 | Polyallomer 5020 | 26.5 |

EXAMPLES 8 to 13

Examples 8 to 13 were carried out to compare different materials for the core layer.

The films of the examples 8 to 13 are the same as the example 2 except for the core layer being the material shown in Table 3. Alathon 3445, Alathon 4210, Chemplex 1060, and Alathon 3135 are ethylene vinyl acetates and Surlyn 1650 is an ionomer.

Table 3

| Ex. | Core Layer | Melt Flow dg/min. | Vinyl Acetate Content % | Source |
|---|---|---|---|---|
| 8 | Alathon 3445 | 0.5 | 3.5 | E. I. du Pont de Nemours & Co. |
| 9 | Alathon 4210 | 0.8 | 9 | E. I. du Pont de Nemours & Co. |
| 10 | Chemplex 1060 | 0.6 | 9 | Chemplex Co. |
| 11 | Alathon 3135 | 0.3 | 12 | E. I. du Pont de Nemours & Co. |
| 12 | Surlyn 1650 | 1.4 | — | E. I. du Pont de Nemours & Co. |
| 13 | Alathon 3165 | 0.7 | 18 | E. I. du Pont de Nemours & Co. |

Table 4 shows the unrestrained shrinkage for machine direction and transverse direction of about 90° C. for the films of examples 8 to 13. The examples 9 to 11 wherein the vinyl acetate of each ethylene vinyl acetate was within the operating range showed good results. The ionomer of the example 12 also showed good results. The example 8 shows unsatisfactory film for a core layer not having the required properties set forth herein. The film of the example 13 is acceptable, but not preferred.

Table 4

| Example | Percent Unrestrained Shrinkage | |
|---|---|---|
| | Machine Direction | Transverse Direction |
| 8 | 14 | 24 |
| 9 | 24 | 34 |
| 10 | 22 | 33 |
| 11 | 22 | 32 |
| 12 | 23 | 33 |
| 13 | 19 | 29 |

EXAMPLE 14

Example 14 is the same as the example 2 except that the weight ratio of the propylene-ethylene copolymer to (butene-1)-ethylene copolymer was 2:1. The unrestrained transverse shrinkage at 90° C. was about 31%.

EXAMPLE 15

Example 15 is the same as the example 2 except that the weight ratio of the propylene-ethylene copolymer to (butene-1)-ethylene copolymer was 1:2. The unrestrained transverse shrinkage at 90° C. was about 33%.

EXAMPLE 16

A resin mixture the same as that used in the first outer layer of the example 2 was prepared and then formed into a film by conventional methods as generally described in the example 2. The film possessed an unrestrained shrinkage at 90° C. for the machine direction and transverse direction of 17% and 31%, respectively.

We wish it understood that we do not desire to be limited to the exact details shown and described, for obvious modifications will occur to a person skilled in the art.

Having described the invention, what we claim as new and desire to be secured by Letters Patent is as follows:

1. A polymer resin mixture comprising:
a propylene-ethylene copolymer having a high isotactic molecular structure, containing up to about 6% by weight ethylene, and having a melt flow of from about 1.5 to about 18 decigrams per minute;
a (butene-1)-ethylene copolymer having a high isotactic molecular structure, containing from about 1% to about 10% by weight ethylene, and having a melt flow of from about 0.1 to about 5.0 decigrams per minute; and
a thermoplastic elastomer selected from the group consisting of ethylene-propylene copolymers and ethylene propylene diene terpolymers, the ratio by weight of said propylene-ethylene copolymer to said (butene-1)-ethylene copolymer being from about 2:1 to about 1:2 and said thermoplastic elastomer being present from about 10% by weight to about 50% by weight.

2. The resin mixture of claim 1, wherein the ratio by weight of said propylene-ethylene copolymer to said (butene-1)-ethylene copolymer is about 2:1.

3. The resin mixture of claim 1, wherein the ratio by weight of said propylene-ethylene copolymer to said (butene-1)-ethylene copolymer is about 1:1.

4. The resin mixture of claim 1, wherein the ratio by weight of said propylene-ethylene copolymer to said (butene-1)-ethylene copolymer is about 1:2.

5. The resin mixture of claim 1, wherein said propylene-ethylene copolymer has a density of from about 0.89 to about 0.91 gram per cubic centimeter.

6. The resin mixture of claim 1, wherein said propylene-ethylene copolymer has a melt flow of from about 3.5 to about 12.0 decigrams per minute.

7. The resin mixture of claim 1, wherein said thermoplastic elastomer is present from about 20% to about 40% by weight.

8. The resin mixture of claim 1, wherein said thermoplastic elastomer comprises an ethylene-propylene copolymer elastomer.

9. The resin mixture of claim 8, wherein said ethylene-propylene copolymer elastomer comprises ethylene in the amount of at least 50% by weight.

10. The resin mixture of claim 9, wherein said ethylene-propylene copolymer elastomer comprises ethylene in the amount of about 70% by weight.

11. The resin mixture of claim 10, wherein said ethylene-propylene copolymer elastomer has a Mooney viscosity at 260° F. of from about 23 to about 50 centipoises.

12. The resin mixture of claim 1, wherein said thermoplastic elastomer comprises an ethylene propylene diene modified terpolymer.

13. The resin mixture of claim 1, wherein the ratio by weight of said propylene-ethylene copolymer to said (butene-1)-ethylene copolymer is about 1:1 and said thermoplastic elastomer is present from about 20% to about 40% by weight.

14. A heat-shrinkable thermoplastic film comprising:
a propylene-ethylene copolymer having a high isotactic molecular structure, containing up to about 6% by weight ethylene, and having a melt flow of from about 1.5 to about 18 decigrams per minute;
a (butene-1)-ethylene copolymer having a high isotactic molecular structure, containing from about 1% to about 10% by weight ethylene, and having a melt flow of from about 0.1 to about 5.0 decigrams per minute; and
a thermoplastic elastomer selected from the group consisting of ethylene-propylene copolymers and ethylene propylene diene terpolymers, the ratio by weight of said propylene-ethylene copolymer to said (butene-1)-ethylene copolymer being from about 2:1 to about 1:2 and said thermoplastic elastomer being present from about 10% by weight to about 50% by weight.

15. The film of claim 14, wherein the ratio by weight of said propylene-ethylene copolymer to said (butene-1)-ethylene copolymer is about 2:1.

16. The film of claim 14, wherein the ratio by weight of said propylene-ethylene copolymer to said (butene-1)-ethylene copolymer is about 1:1.

17. The film of claim 14, wherein the ratio by weight of said propylene-ethylene copolymer to said (butene-1)-ethylene copolymer is about 1:2.

18. The film of claim 14, wherein said propylene-ethylene copolymer has a density of from about 0.89 to about 0.91 gram per cubic centimeter.

19. The film of claim 14, wherein said propylene-ethylene copolymer has a melt flow of from about 3.5 to about 12.0 decigrams per minute.

20. The film of claim 14, wherein said thermoplastic elastomer is present from about 20% to about 40% by weight.

21. The film of claim 14, wherein said thermoplastic elastomer comprises an ethylene-propylene copolymer elastomer.

22. The film of claim 21, wherein said ethylene-propylene copolymer elastomer comprises ethylene in the amount of at least 50% by weight.

23. The film of claim 22, wherein said ethylene-propylene copolymer elastomer comprises ethylene in the amount of about 70% by weight.

24. The film of claim 23, wherein said ethylene-propylene copolymer elastomer has a Mooney viscosity at 260° F. of from about 23 to about 50 centipoises.

25. The film of claim 14, wherein said thermoplastic elastomer comprises an ethylene-propylene diene modified terpolymer.

26. The film of claim 14, wherein the ratio by weight of said propylene-ethylene copolymer to said (butene-1)-ethylene copolymer is about 1:1 and said thermoplastic elastomer is present from about 20% to about 40% by weight.

* * * * *